US009535726B2

(12) United States Patent
Lagerblad et al.

(10) Patent No.: US 9,535,726 B2
(45) Date of Patent: Jan. 3, 2017

(54) REVERSE DEPENDENCY INJECTION IN A SYSTEM WITH DYNAMIC CODE LOADING

(71) Applicant: Oracle International Corporation, Redwood Shores, CA (US)

(72) Inventors: Bo Jonas Birger Lagerblad, Palo Alto, CA (US); Arun Lakshminarayan Katkere, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 14/866,343

(22) Filed: Sep. 25, 2015

(65) Prior Publication Data

US 2016/0092246 A1    Mar. 31, 2016

Related U.S. Application Data

(60) Provisional application No. 62/056,420, filed on Sep. 26, 2014, provisional application No. 62/079,363, filed on Nov. 13, 2014.

(51) Int. Cl.
  *G06F 9/44*   (2006.01)
  *G06F 9/445*  (2006.01)

(52) U.S. Cl.
  CPC .................. *G06F 9/44526* (2013.01)

(58) Field of Classification Search
  None
  See application file for complete search history.

(56) References Cited

U.S. PATENT DOCUMENTS

| 6,377,939 | B1 * | 4/2002 | Young ............................. 705/34 |
| 8,224,770 | B2 | 7/2012 | Lunev et al. |
| 8,490,055 | B2 | 7/2013 | Basak |
| 8,533,336 | B1 * | 9/2013 | Scheffler et al. ............. 709/226 |

(Continued)

OTHER PUBLICATIONS

Kamruddin Md. Nur et al. "Software Visualization Tools for SoftwareComprehension", 2010.*

(Continued)

*Primary Examiner* — Lechi Truong
*Assistant Examiner* — Abdou Seye
(74) *Attorney, Agent, or Firm* — Kilpatrick Townsend and Stockton LLP

(57) ABSTRACT

Embodiments are directed to utilizing reverse dependency injection for managing bootstrapping of applications in web browser and mobile environments. By using reverse dependency injection, embodiments enable a component to declare that it is a "dependency of" another component in a visual analyzer application. This ensures that the dependencies are loaded before the other component is loaded, thereby minimizing delays when a user starts up an application. In some embodiments, information identifying a plugin to be loaded can be received. Embodiments can determine configuration information for the plugin where the configuration information includes both forward and reverse dependencies. Embodiments may generate, based on the configuration information, a data structure that represents the forward and reverse dependencies. Embodiments may analyze the data structure to determine an ordered list of loadings. Some embodiments may load the individual components per the ordered list of loadings and indicate that the plugin is ready for execution.

20 Claims, 9 Drawing Sheets

(56) References Cited

U.S. PATENT DOCUMENTS

| | | | |
|---|---|---|---|
| 8,589,727 B1* | 11/2013 | Fletcher et al. | 714/13 |
| 8,745,584 B2 | 6/2014 | Huang et al. | |
| 8,856,734 B2 | 10/2014 | Thyagarajan et al. | |
| 2003/0121031 A1 | 6/2003 | Fraenkel et al. | |
| 2008/0208960 A1* | 8/2008 | Rowley et al. | 709/203 |
| 2008/0235710 A1* | 9/2008 | Challenger et al. | 719/316 |
| 2010/0064284 A1 | 3/2010 | Winter | |
| 2010/0162248 A1 | 6/2010 | Plancarte et al. | |
| 2011/0016477 A1 | 1/2011 | Schechter et al. | |
| 2013/0347104 A1* | 12/2013 | Raber et al. | 726/22 |

OTHER PUBLICATIONS

Athento Platform Developer Guide, "Components model" retrieved from http://doc.athento.com/xwiki/bin/view/Athento+model#.VVHk146qqkp on May 12, 2015, 6 pages.

Martin Fowler, "Inversion of Control Containers and the Dependency Injection pattern" dated Jan. 23, 2004, retrieved from http://martinfowler.com/articles/injection.html on May 12, 2015, 28 pages.

"Room 101: Lethal Injection" dated Dec. 16, 2007, retrieved from http://gbracha.blogspot.in/2007/12/some-months-ago-i-wrote-couple-of-posts.html on May 13, 2015, 10 pages.

\* cited by examiner

```
// The entire content of the module is wrapped in a call to a function called define,
// which is implemented by the RequireJS framework, this file format is called AMD
// see https://github.com/amdjs/amdjs-api/blob/master/AMD.md for more information.
// The module object returned exposes the public API for this module.
define([ 'jquery',
        'obitech-framework/jsx',
        'obitech-framework/uif-component',
        'obitech-thirdparty/openajaxhub',
        'obitech-application/bi-definitions',
        'ojL10n!obitech-appservices/appServices/nls/messages',
        'ojs/ojcore',
        'obitech-framework/messageformat'],
        function($, jsx, uif, OpenAjax, definitions, messages, oj) {
    // Module implementation goes here
    var module = {};
    module.globalFunction = function(){
        privateFunction();
    };
    function privateFunction() {
        uif.doSomething(definitions.SOME_CONSTANT);
    }
    return module;
});
```

*FIG. 4A*

```
// a method for creating a visualisation based on a plug-in name
public void createViz(String vizId){
    PluginDefinition def = this.getPluginDefinition(vizId);
    if (def != null) {
        // create instance
        Viz viz = def.getNewInstance();
        this.attachViz(viz);
    }
}
```

*FIG. 4B*

```
// a method for creating a visualisation based on a plug-in name
Myclass.prototype.createViz = function(vizId){
    var that = this;
    this.getPluginDefinition(vizId, function(def){
        // This inner function is called asynchronously once the code implementing the
        // factory method has been loaded
        if (def != null) {
            // create instance
            def.getNewInstance(function(viz) {
                // this innermost function is called once the code for the visualization
                // has been loaded and an instance has been created
                that.attachViz(viz);
            });
        }
    });
};
```

*FIG. 4C*

REVERSE DEPENDENCY INJECTION IN A SYSTEM WITH DYNAMIC CODE LOADING

CROSS-REFERENCES TO RELATED APPLICATIONS

This application is a non-provisional application and claims the benefit and priority of U.S. Provisional Application No. 62/056,420, filed on Sep. 26, 2014, titled "REVERSE DEPENDENCY INJECTION IN A SYSTEM WITH DYNAMIC CODE LOADING," and U.S. Provisional Application No. 62/079,363, filed on Nov. 13, 2014, titled "VISUAL ANALYZER SYSTEM," both of which are herein incorporated by reference in their entirety for all purposes.

BACKGROUND

Frameworks and Web environments using Java and other compiled languages (e.g., Spring Framework) may use regular dependency injection that allows a component to declare that it requires another component. Typically, a system can simply create an instance of the other component when the system determines that the component needs the other component and that there is not one already created. However, when the system is being run in a Web browser, there may be long delays when the system needs to request the JavaScript file that implements the other component from the server as the user performs a request to interact with the component. An instance may not be created without noticeable delays even while performing an asynchronous call to the server to download the JavaScript file. It would be inefficient and diminishing for the user experience for the system to load and create an instance of the other component at the point when the system determines that the other component is needed.

SUMMARY

Embodiments are directed to utilizing reverse dependency injection for managing bootstrapping of applications in web browser and mobile environments. In some embodiments, a visual analyzer framework may have an application of components in which forward and reverse dependencies are declared. Some embodiments allow one or more components to declare that it is a "dependency" on another component (also referred to as a reverse dependency relationship). Utilizing reverse dependency injection enables dependencies to be loaded before the other component is loaded, thereby minimizing delays when a user starts up an application.

When a user signals to launch an application, the visual analyzer framework may determine forward and reverse dependency relationships among the components of the application. A complex dependency graph may be built for the components where the graph indicates the components that need to be loaded and the order in which the components should be loaded before the application may be ready for interaction with a user. In some embodiments, this framework enables the building of an architecture where the top-level component need not know about the dependencies of its children.

Some embodiments provide techniques (e.g., a method, a system, non-transitory computer-readable medium storing code or instructions executable by one or more processors) for enabling a component to declare that it is a dependency on another component, or in other words, declare a reverse dependency relationship with the other component. One such technique can include receiving, by one or more processors, information identifying a plugin to be loaded; determining configuration information for the plugin; based on the configuration information, generating a data structure which represents both the forward and reverse dependencies; analyzing the data structure to determine an ordered list of loadings; loading the individual components based on the ordered list of loadings; and indicating that the plugin is ready for execution.

In some embodiments, the forward dependency indicates one or more components that are declaratively needed by a component in the plugin. In certain embodiments, the reverse dependency indicates that the component declares that the component is needed by one or more other components. The technique can further include enabling a set of components to declare forward and reverse dependencies with another set of components for the plugin, where a component is declared to be a reverse dependency of another component, and where the component is loaded prior to providing an indication that the other component is ready for execution. In certain embodiments, the component is a data service component and wherein the other component is a report component or a data visualization component of a visual analyzer application.

In some embodiments, the configuration information includes dependency information between components of the plugin. The technique can further include storing first dependency information for a first component, the first dependency information indicating that the first component is a dependency of a second component; receiving a signal to load the second component; determining, based on the first dependency information, that the first component is a dependency of the second component; and loading both an instance of the first component and an instance of the second component responsive to the signal.

In certain embodiments, the first component is a data service component and the second component is a report component. The technique can further include receiving, via the second component, a first request to create an instance of a first visualization component and a second request to create an instance of a second visualization component; responsive to the first request, loading an instance of the first visualization component, the first visualization component depending upon the first component; using, by the instance of the first visualization component, the instance of the first component; responsive to the second request, loading an instance of the second visualization component, the second visualization component depending upon the first component; and using, by the instance of the second visualization component, the same instance of the first component. The technique can further include storing second dependency information for the second component, where the second dependency information does not indicate that the second component is dependent upon the first component.

Some embodiments can managing bootstrapping of applications in web browser and mobile environments by providing a visual analyzer plugin framework that utilizes reverse dependency injection. In some embodiments, a component can declare that it is a dependency of another component and ensure that the component is loaded before the other component is loaded. By ensuring that both the forward and reverse dependencies are loaded before an application is presented as ready for interaction with a user can reduce delays. For example when a user starts up a visual analyzer application via a Web browser and accesses the visual analyzer system via the Web browser, if a data service instance has not been pre-loaded, the user may experience undesirable delays in interacting with a visualization waiting for the data service instance to be created.

BRIEF DESCRIPTION OF THE DRAWINGS

FIGS. 4A-4D illustrate an example of utilizing reverse dependency injection to load JavaScript modules in a visual analyzer application according to some embodiments of the present invention.

DETAILED DESCRIPTION

Figure 1:
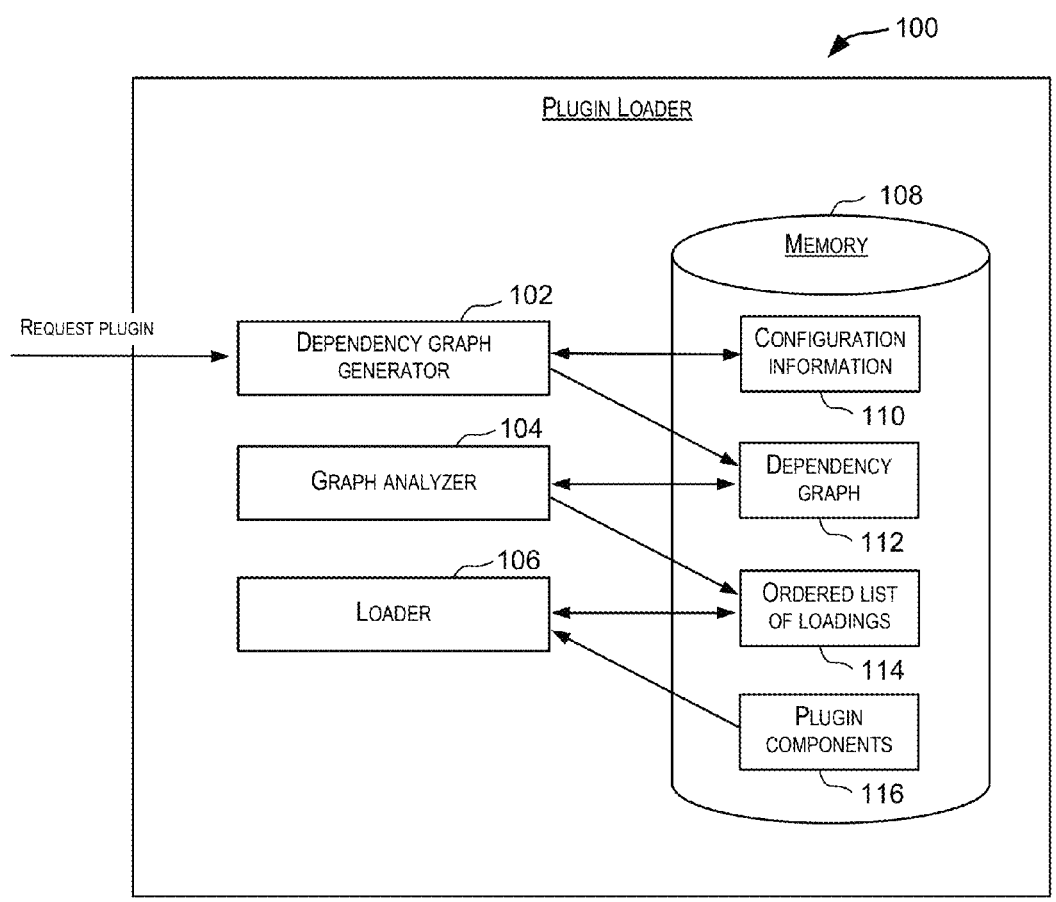
FIG. 1 illustrates an example block diagram of a plugin loader in accordance with some embodiments of the present invention.

In the following description, for the purposes of explanation, specific details are set forth in order to provide a thorough understanding of embodiments of the invention. However, it will be apparent that various embodiments may be practiced without these specific details. The figures and description are not intended to be restrictive. Embodiments may be described hereinafter with reference to the accompanying drawings, in which some, but not all, embodiments of the invention are shown. The invention may be embodied in many different forms and should not be construed as limited to the embodiments set forth herein.

Embodiments of the present invention are directed to techniques (e.g., a system, a method, a memory or non-transitory computer readable medium storing code or instructions executable by one or more processors) for using reverse dependency injection in bootstrapping an application such as a Web application. In some embodiments, a user may interact with a visual analyzer system through a Web application. In certain embodiments, depending on how the application is bootstrapped, interacting with a component of the visual analyzer system may require the use of another component that may not be readily available. It may be necessary to go to the server and get new Web pages or JavaScript files loaded from the server. For instance, if a data service instance is not pre-loaded when a user begins interacting with a visualization component in a visual analyzer application, the application may then need to create an instance of the data service. In the meantime, the user may encounter a lag in the system, thereby causing the user experience to be greatly diminished. Some embodiments can provide a visual analyzer plugin framework that uses reverse dependency injection. In some embodiments, a component can declare that it is a dependency of another component to ensure that the dependency component is loaded before the other component is loaded. Certain embodiments may ensure that dependencies are loaded before allowing a user to interact with the application. As such, delays may be minimized when a user begins interacting with the various components of a visual analyzer application through the Web browser.

In some embodiments, information identifying a plugin to be loaded can be received. Embodiments can determine configuration information for the plugin where the configuration information includes both forward and reverse dependencies. Embodiments may generate, based on the configuration information, a data structure that represents the forward and reverse dependencies. Embodiments may analyze the data structure to determine an ordered list of loadings. Some embodiments may load the individual components per the ordered list of loadings and indicate that the plugin is ready for execution.

In some embodiments, a visual analyzer system can present one or more visualizations to a user via a visual analyzer application presented by a web browser (e.g., on a mobile device). In certain embodiments, a visualization is a visual representation of some data. In one embodiment, a visualization can display graphic elements, shapes and/or text. Examples of a visualization may include a table, a cross table, a graphical table, a bar chart, a line chart, a combination chart, a pie chart, a scatterplot, a map chart, a treemap, a heat map, a parallel coordinate plot, a summary table, a box plot, a text area, a user created or customizable chart, etc. The visual analyzer system may generate a visualization with multiple graphical attributes (also referred to as edges) that each correspond to a specified dimension. For example, a visual analyzer application can generate a bar chart with color, axis, size attributes that each corresponds to a dimension specified by a user such as time, sales, and entities. Each dimension may also have one or more dimension members, such as years 2009, 2010, 2011, company names X, Y, Z, and different types of products, etc.

Each visualization can include values for multiple dimensions of data from one or more columns in a database in some embodiments. A database can be a relational database that includes one or more tables. A table can have a set of rows and a set of columns. A dimension can correspond to a column of a table (or a database) while a record can correspond to a row of a table (or a database). In some embodiments, the visual analyzer application user interface (e.g., displayed through a web browser) can provide a projection of one or more databases. The user can identify one or more dimensions of data available in the one or more databases and request the visual analyzer application to generate a visual representation that represents the one or more dimensions of data retrieved from the databases.

In some embodiments, a visualization can have one or more edges (also sometimes referred to as an attribute) that represent the various dimensions (also referred to as criteria or columns of a database) of the visualization. A common set of edges can include row (also referred to as x-axis), column (also referred to as y-axis), category, values, color shape, size, etc. For example, a scatter chart may use all of those edges. A bar chart may use row, column, category, values, color, and size. A pivot table may use all of the common set of edges except for detail. A map may use row, column, category, color (map shape), color (bubble), and size. Different dimensions can include revenue, brand, year, company name, product type, etc. A dimension can be represented by an edge of a visualization. For example, a brand dimension can be represented by the color edge of a pie chart (or any other type of visualization), a revenue dimension can be shown in the values edge of a bar chart (or any other type of visualization), a year dimension can be shown in the rows edge (e.g., trellis rows that are good for small multiples), a company dimension can be shown in the columns edge (e.g., trellis columns), a product type dimension can be represented by the shape edge where each distinct value (also referred to as dimension member) is assigned a shape (e.g., circle, square, diamond, etc.), etc.

Each visualization may have configuration information that includes one or more edge identifiers identifying the edges of a visualization, one or more edge values corresponding to each edge, and one or more edge tags for each edge. The edge identifiers identifying the edges of a visualization can include a visualization type, a color, a size, an area, x-axis, y-axis, geo-coordinates, etc. Different visualizations of different visualization types may have a different set of edges. For instance a pie chart can have the following edges: color, size, etc. while a bar chart may have the following edges: x/col, y/row, color, category, values, color, size, etc.

Each edge can have one or more edge values and one or more edge tags (also referred to as functional tags or just tags). In some embodiments, the functional tags can be properties of edges on a visualization that describe what those edges do to a data column. In some embodiments, the edge tag can indicate whether an edge is a required edge or not a required edge for a visualization. If the edge tag indicates that an edge is a required edge, then the edge must have a value for the visualization to render in some embodiments. Certain embodiments may not have any required edges for any visualization.

The visual analyzer system can generate one or more visualizations based on one or more dimensions of data specified by a user. For example, the user may specify multiple dimensions such as time, sales, and entities to be represented by a visualization. The visual analyzer system may then generate a visualization with multiple edges (also referred to as graphical attributes) that each correspond to a specified dimension. For example, a visual analyzer application can generate a bar chart with color, axis, size edges that each corresponds to a dimension specified by a user such as time, sales, and entities, respectively. As described, the visual representation may be a pie chart, bar chart, or any other type of graphic where different edges such as color, axis, size, etc. can represent the desired dimensions specified by the user.

Systems depicted in some of the figures may be provided in various configurations. In some embodiments, the systems may be configured as a distributed system where one or more components of the system are distributed across one or more networks in one or more cloud infrastructure systems.

As used herein, the term "forward dependency" is used to refer to a component declaring that it requires or needs another component. For instance, A declares that A needs or "depends on" B. The component that has a forward dependency relationship with the other component knows of the other component in order to be able to declare that it "depends on" the other component.

As used herein, the term "reverse dependency" is used to refer to a component declaring that another components needs the component. For instance, rather than A declaring that A needs or "depend on" B, A declares that A is needed by B. If the component has a reverse dependency relationship with the other component, then if the other component is loaded, the component should also be loaded.

The term "server" as used herein typically refers to an application that executes and operates as a server according to a client-server protocol. Some examples of servers include database servers, web servers, application servers, file servers, mail servers, print servers, gaming servers, etc. In some contexts, though, the term "server" may also refer to computing hardware that can or does execute a server application. However, the particular meaning of a use of the term "server" will be apparent to those of skill in the art based upon its context of use.

Conventional application frameworks or environments utilizing Java and other compiled languages (e.g., Spring Framework) may use regular dependency injection. When developing a component in e.g., a Java program, regular dependency injection allows a component to declare that if it is e.g., a data visualization, then it must have a handle to the data service because the data visualization would need to fetch its data. As such, the visualization declares e.g., in an XML file, that it needs a data service. The framework creates the visualization, reads the XML file and determines that this visualization component needs a data service. The framework then creates the data service and provides a handle to that visualization. In this instance, the visualization need not care about creation of dependencies since it just declares that it needs a data service (or any other service) and the framework that creates the visualization will then become aware of that. Regular dependency injection is a common pattern that is used when developing programs in Java.

In such environments targeted mostly for Java and other compiled languages, a system may simply create an instance of a data service when a visualization component indicates that it needs a data service. However, in a Web environment, an instance of a data service cannot be created immediately without doing an asynchronous call to the server to download the JavaScript file. When the system is being run via a Web browser, there may be long delays for the system to request the JavaScript file that implements the data service from the server(s). It would not be efficient to load and create the data service instance at the point when the system determines that the data service is needed in response to a user's interaction with the visualization. As such, there is a need for a more efficient system that can minimize delays when the user interacts with the various components of a visual analyzer system in the Web environment.

In some embodiments, a plugin framework can provide a module dependency mechanism where forward and reverse dependencies can be declared. For instance, a view suggest component can be associated with a report component where report component does not need view suggest component to function. Instead of declaring view suggest module as a dependency in report module, it is declared as a module dependency to report module via the module dependency mechanism. As such, the plugin framework ensures that view suggest module is loaded before report module is loaded in some embodiments.

As described, some embodiments relate to enabling a first component to declare that it is a "dependency of" a second component (also referred to as a reverse dependency relationship). This can be differentiated from the situation where the second component declares that it depends upon the first component. In an embodiment, the second component may not even be aware of the first component. For example, consider a report generation application executed by a browser on a client device: the application may include a report component that can be used to create multiple visualization components. The visualization components may each need to use a data service component. In the past, the visualization components would each declare them to be dependent upon the data service components. However, according to some embodiments, the data service component instead declares that it is a dependency of the report component. Accordingly, whenever the report component is to be loaded, an instance of the data service component is also loaded independent of the visualization components. As such, when instances of the visualization component are loaded, they can use the pre-loaded instance of the data service component.

In some embodiments, creation and loading of a visualization component does not have to wait for the creation and loading of a data service and can use the pre-loaded data service component. Also, when multiple visualization components are to be created, the problem of potentially creating multiple instances of the data service components is also avoided since the visualization components can all use the same instance of the pre-loaded data service component. According to certain embodiments, a dependency analysis may then no longer be necessary where the information is stored on the server and that the user would need to go back and forth with the server to retrieve dependency information and load a component (e.g., a data service component) when the component is determined to be needed. This "pre-setup" anticipates what a user of the visual analyzer application may need and may do with respect to the interactions with components of the application. Instead of requiring each component to be hardcoded with what each component is dependent upon, enabling each component to declare its forward and reverse dependencies provides flexibility.

I. System Overview

FIG. 1 illustrates an example block diagram of a plugin loader 100 in accordance with some embodiments of the present invention. In some embodiments, plugin loader 100 can determine forward and reverse dependencies among components of a plugin and load the multiple components before indicating that the plugin is ready for execution. In certain embodiments, plugin loader 100 can be part of a standalone executable application such as a visual analyzer application, a portion of an application (e.g., a browser application or a local application), a configuration file to be used with another application, etc. with components distributed across one or more servers or a client device.

A visual analyzer application can display one or more visual analyzer components (e.g., a visualization, a toolbar, a data elements pane) via a graphical user interface (GUI) e.g., on a client device. User interaction with a component may require the use of one or more components of the application that may or may not be available at the moment the component requires access to the one or more components. If a component that is needed by the user interaction with the other component is unavailable, the application may send a request to one or more servers to create an instance of the component.

For instance, user interaction with a visualization may require the use of an instance of a data service component. If the instance of the data service is not available when the user requests to modify the data represented by the visualization, the application may send a request to one or more servers to generate the instance of the data service. Requiring the application to request for additional components at the time they are needed causes a lag in the system, requiring the user to wait until the additional components have been generated to perform any additional requests. Plugin loader 100 may minimize lag time and processing inefficiencies and increase responsiveness of a visual analyzer application accessed via a Web browser by utilizing forward and reverse dependency relationships among components of the application.

As shown, in certain embodiments, plugin loader 100 can include a dependency graph generator 102, a graph analyzer 104, a loader 106, and memory 108. The embodiment depicted in FIG. 1 is merely an example and is not intended to unduly limit the claimed embodiments of the present invention. One of ordinary skill in the art would recognize many variations, alternatives, and modifications.

In some embodiments, dependency graph generator 102 can create a dependency graph (also referred to as a component hierarchy graph) for a software component such as a plugin module. A plugin can be a client-accessible resource or a package of resources (e.g., JavaScript, CSS, resource bundle, XSD schema, images, etc.). In certain embodiments, the dependency graph can be generated using configuration information associated with the plugin module. The dependency graph can include forward and reverse dependency information for components of the plugin module. The hierarchical structure of the graph can indicate the forward and reverse dependency relationships among various components of the plugin. By traversing the dependency graph, some embodiments can determine an order in which to load the components. In some embodiments, the root node of the dependency graph can represent the report component or the visual analyzer application indicating that the application is not set to start until all the child nodes have been loaded. In some embodiments, dependency graph generator 102 may execute on a computing device such as a server or on a client device.

In certain embodiments, graph analyzer 104 may analyze the dependency graph by traversing the dependency graph and then ordering the list of component loadings. The list of component loadings may indicate the order in which the components should be loaded. For example, the list of component loadings may indicate to load in component C, then component A, then component D, etc. In some embodiments, graph analyzer 104 may execute on a computing device such as a server or on a client device.

Loader 106 may load one or more components for the plugin before plugin loader 100 may indicate that the plugin is ready for execution and interaction with a user. In some embodiments, loader 106 may load the components in an order specified by a list. In certain embodiments, loader 106 may execute on a client computing device.

Memory 108 can include configuration information 110 for one or more plugin modules, dependency graph 112, ordered list of loadings 114, and a registry of plugin components 116. Configuration information 110 can include forward and reverse dependency information for components in a plugin. For instance, configuration information 110 for a plugin can indicate the components in the plugin that have declared that the components need one or more other components. Configuration information 110 for the plugin can also indicate the components that have declared that the components are needed by one or more other components. Some embodiments can determine configuration information for a plugin based on the configuration block of software code for each component of the plugin. Within the configuration block of software code, the forward and reverse dependency information for a component can be declared in certain embodiments. As such, dependency graph generator 102 can use configuration information 110 to generate the dependency graph for the plugin.

In some embodiments, dependency graph 112 can include a dependency graph for one or more plugins. The dependency graph can be a hierarchical graph that indicates the relationship among different components of a plugin. For instance, a dependency graph may indicate that certain components are parent nodes while other components may be child nodes. In some embodiments, a dependency graph can indicate the components that are needed to be loaded in order for a component (e.g., a parent node) to be ready for execution. In certain embodiments, a dependency graph may also convey a forward dependency relationship between two (or more) components. The dependency graph may also convey a reverse dependency relationship between two (or more) components. Different embodiments may have different organizational structures for the dependency graph.

In certain embodiments, ordered list of loadings 114 may include a list (e.g., an array) that indicates one or more components to be loaded in an order. Loader 106 may load one or more components of a plugin based on an order indicated by ordered list of loadings 114. In some embodiments, loader 106 may retrieve the one or more components from registry of plugin components 116 in memory 108.

In some embodiments, registry of plugin components 116 includes the components of a plugin (can also be referred to as subcomponents of a plugin component) to be loaded by loader 106. Plugin components 116 can be loaded by loader 106 based on an order indicated by ordered list of loadings 114. In some embodiments, plugin components 116 can include a data service instance. In certain embodiments, the plugin components can be located across various servers.

In some embodiments, plugin loader 100 can receive a request for a plugin. For example, a user may request, via a browser on a client computing device, to start a visual analyzer application or a report in the application. Upon receiving the request, dependency graph generator 102 can obtain configuration information 110 for the plugin and generate a dependency graph based on the forward and reverse dependency information for various components of the report component in configuration information 110. Graph analyzer 104 may then analyze dependency graph 112 and generate an ordered list of loadings 114. Loader 106 may load the individual components 116 one after another based on ordered list of loadings 114. After plugin components 116 have been loaded, the plugin may be ready for execution. In some embodiments, plugin loader 100 may send a signal to user device indicating that the various components of plugin loader 100 have been loaded and that the plugin is now ready for execution and available for interaction with the user.

II. Example Computing Environment

Figure 2:
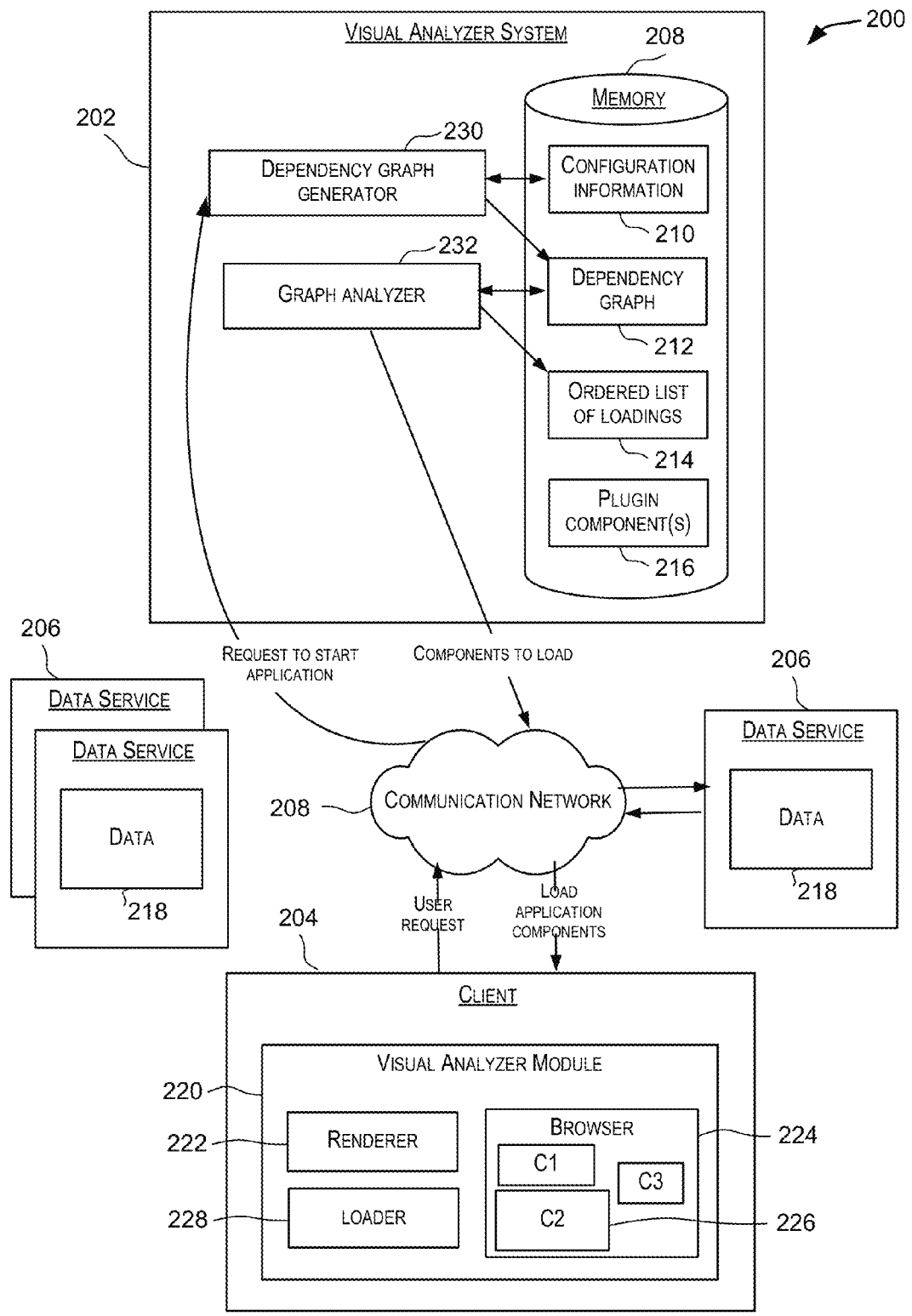
FIG. 2 illustrates an example block diagram of a computing environment in accordance with certain embodiments of the present invention.

FIG. 2 illustrates an example block diagram of a computing environment 200 in accordance with certain embodiments of the present invention. As shown, computing environment 100 includes a visual analyzer system 202 communicatively coupled to client device 204 and data service(s) 206 via a communication network 208. The embodiment depicted in FIG. 2 is merely an example and is not intended to unduly limit the claimed embodiments of the present invention. One of ordinary skill in the art would recognize many variations, alternatives, and modifications. For example, visual analyzer system 202 can be part of client device 204. In another example, visual analyzer system 202 and/or visual analyzer module 220 or components of visual analyzer module 220 (e.g., renderer 222 or loader 224) can be located on one or more servers.

Client device 204 may be of various different types, including, but not limited to a personal computer, a desktop, a mobile or handheld device such as a laptop, a mobile phone, a tablet, etc., and other types of devices. Communication network 208 facilitates communications between one or more client devices such as client device 204 and visual analyzer system 202. Communication network 208 can be of various types and can include one or more communication networks. For example, communication network 208 can include, without restriction, the Internet, a wide area network (WAN), a local area network (LAN), an Ethernet network, a public or private network, a wired network, a wireless network, and the like, and combinations thereof. Different communication protocols may be used to facilitate the communications including both wired and wireless protocols such as IEEE 802.XX suite of protocols, TCP/IP, IPX, SAN, AppleTalk, Bluetooth, and other protocols. In general, communication network 208 may include any communication network or infrastructure that facilitates communications between one or more client devices such as client device 204 and visual analyzer system 202.

Client device 204 can display one or more visual representations (also referred to as data visualizations, graphics, charts, a type of component, or vizs) through a web browser or a GUI of a visual analyzer application in some embodiments. A visual representation can be generated based on dimensions of data (also referred to as columns in a database, or business objects) identified by a user of client device 204. In some embodiments, a user of client device 204 can select one or more dimensions of data 218 available from various data services 206. Upon receiving the user's selection of the one or more dimensions of data 218, visual analyzer module 220 can obtain the requested data from data service 206 via communication network 208 and generate a visual representation 226. Renderer 222 can then render visual representation 226 on GUI 224 of browser 224 on client device 204.

The various components of plugin loader 100 from FIG. 1 can be shown distributed across visual analyzer system 202 and visual analyzer module 220 in this example. A GUI 224 can present one or more plugins (e.g., a report component, a visualization component 226) to a user and allow the user to interact with the one or more plugins when a plugin loader (similar to plugin loader 100 from FIG. 1) or components of the plugin loader indicates that the plugin is ready for execution and interaction in some embodiments.

In certain embodiments, visual analyzer module 220 can generate multiple visual analyzer components (e.g., data visualizations, windows, menus, property panes, etc.) and cause those components 226 to be displayed on a dashboard of the application (e.g., GUI 224). In some embodiments, visual analyzer module 220 on client device 204 can be part of a browser application or a local application. The web browser or the visual analyzer application user interface can provide a projection of one or more databases. The user can identify one or more dimensions of data available in the one or more databases and request the visual analyzer application to generate a visual representation that represents the one or more dimensions of data retrieved from the databases. As described, an example of a database is a relational database with columns and rows. A dimension of data can correspond to a column in a database while records can correspond to the rows in the database.

Visual analyzer system 202 can include multiple components such as, but not limited to, dependency graph generator 230 (similar to dependency graph generator 102 of FIG. 1), graph analyzer 232 (similar to graph analyzer 104 of FIG. 1), and memory 208 including configuration information 210, dependency graph 212, ordered list of loadings 214, and one or more sub-components of one or more plugin components 216. Each plugin component can have multiple sub-components and a plugin component may have its associated configuration information 210 stored in memory 206. In some embodiments, the configuration information 210 for each plugin includes both forward dependencies and reverse dependencies among the various components of the plugin. For instance, the configuration information for a plugin component can specify that sub-component A's forward dependency is on sub-component B (i.e., A needs (or depends) on B). The configuration information for the plugin component can also specify that sub-component C's reverse dependency is on sub-component A (i.e., C is needed by A). Reverse dependency is when a component declares that if this other component is loaded (e.g., A) then the component should also be loaded (e.g., C), or this other component (e., A) needs the component (e.g., C), without requiring A to know anything about C. In other words, rather than C needing A, C is needed by A, while A does not declare or know anything about C.

In some embodiments, the client side 204 can include a browser 224 which has a loader 228 associated with the browser. Upon receiving a user request to start an application or to create a report (e.g., from client 204), dependency graph generator 230 (or a separate framework manager (not shown here)) can generate a dependency graph 130 for bootstrapping the application. As described, in some embodiments, a dependency graph for a component such as an application can indicate dependency relationship between various components that may have declared direct or reverse dependency with the component(s). The dependency graph may be indicate which components or services may be necessary for certain components to be operational. In certain embodiments, the dependency graph may provide information as to which components need to be loaded before which components and/or which service instances need to be created prior to which components.

In some embodiments, dependency graph generator 230 may create the dependency graph for the component by retrieving configuration information 210 associated with the component. The configuration information 210 associated with the plugin component can include a number of module declarations among the different sub-components of the plugin component. In some embodiments, a system administrator, a developer, or a user can declare dependencies between various components. Dependency relationships between two modules/components can be stored in configuration information 210. As described, embodiments provide the ability of a component to declare that it is a dependency of some other component so that when the other component gets executed the component is also executed. Configuration information 210 can be a plugin .XML file in a root directory of the plugin package, which contains declaration of modules, resources, and extensions. This file can then be read by the server side plugin service such as dependency graph generator 230 (or a framework manager).

In some embodiments, dependency graph generator 230 can be located on client 204. Upon receiving the user request to load the plugin, the associated configuration information 210 may be downloaded onto client 204. Dependency graph generator 230 may then create the dependency graph using the downloaded configuration information 210. The dependency graph may represent the forward and reverse dependencies based on configuration information (e.g., dependencies declarations in the code) of the various components of the plugin.

Graph analyzer 232 may analyze the generated dependency graph 212 by traversing the graph and then generate an ordered list of component loadings 214. The list of component loadings 214 may indicate the order in which the components should be loaded. For example, the list of component loadings may indicate to load in sub-components C, then A, then, D, etc. This list may be sent to the loader component 228, which then loads the components 216 in the order specified by the list. After loading the components 216, the plugin may now be ready for execution.

In some embodiments, loader 228 can create instances of various services (e.g., data service, report editing service) and/or load various components based on the ordered list of components. After the necessary components are loaded and the necessary service instances are created, in certain embodiments, loader 228 may send an indication that the application is ready to be used. Visual analyzer module 220 on client 204 may then allow a user to start using the application. Renderer 222 may render the appropriate window to the user via GUI on browser 224. The user may then create graphics using various tools provided by the visual analyzer application. For instance, a data service may be ready before the application is started and a report created. When the user starts to create the data visualizations, the data service would be readily available.

In some embodiments, there may be multiple visualizations that all use the same components. For example, there may be multiple components that all use the same service. Instead of loading multiple instances of the service, some embodiments need not load multiple instances of the service and may just load the service once. Since the service may already be loaded, subsequent instances of the visualization may still use the same instance of the previously loaded data service instance. In certain embodiments, it would no longer be necessary to load another instance of the data service as multiple instances of the same component is not needed.

III. Example Flow Chart

Figure 3:
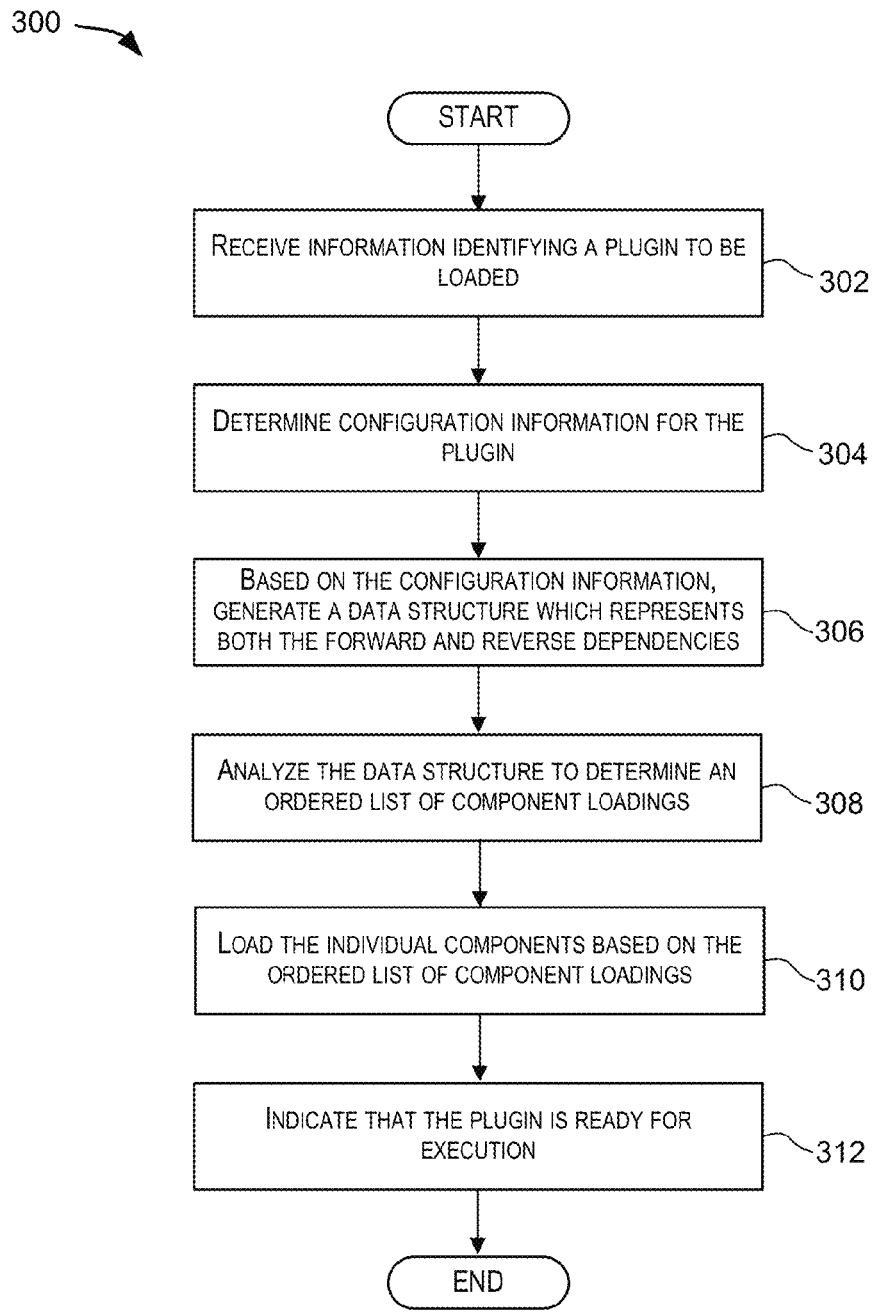
FIG. 3 illustrates an example process of loading an application that uses reverse dependency injection in accordance with some embodiments of the present invention.

FIG. 3 illustrates an example process 300 of loading an application that uses reverse dependency injection in accordance with some embodiments of the present invention. Embodiments provide a visual analyzer plugin framework that enables services and components to declare that it is a dependency for another component. For instance, a service such as a data service may declare that it is a dependency for a report component. The visual analyzer system ensures that the service dependencies and component dependencies are ready before the application is made available to the user.

At block 302, process 300 can receive information regarding plugin to be loaded. In some embodiments, an application can receive a user request to interact with a plugin component or other type of component that is part of the visual analyzer application. The information regarding the plugin to be loaded can be information identifying the plugin component. In some embodiments, identifying information can include a unique ID and version of the plugin.

At block 304, process 300, can determine configuration information for the plugin. A plugin can have multiple components. A component can declare forward dependencies and/or reverse dependencies. An example of a forward dependency is when the component declares that the component needs another component. The reverse dependency would be when another component declares that the other component is needed by the component. Some embodiments can determine the configuration information for the plugin by analyzing the software code declarations for each component of the plugin.

At block 306, process 300 can, based on configuration information, generate a data structure that represents both forward and reverse dependencies. One embodiment of the data structure can be a graph. There could be other types of data structures as well. Some embodiments may generate a dependency graph that shows the forward and reverse dependencies among multiple components that are part of the requested plugin component.

At block 308, process 300 can analyze the data structure to determine the ordered list of loadings. Some embodiments may traverse the dependency graph and determine an order in which the components are to be loaded.

At block 310, process 300 can load the individual components per the ordered list of loadings. In some embodiments, the loading may be performed on the client. In certain embodiments, a loader may be on the server side where the loader may send the components to the client in an order identified by the ordered list of loadings. The client may then receive the components to load in an order and load them individually.

At block 312, process 300 can indicate that the plugin is ready for execution. Upon completing the loading of the components, the visual analyzer application may mark each component as ready for execution and enable the user to interact with the plugin (e.g., a report component of the visual analyzer application, or the application itself). In certain embodiments, the user may now interact with a report in a visual analyzer application. The user can proceed to create one or more visualization components that may utilize data service components that have already been created.

IV. Example of Utilizing Reverse Dependency Injection to Load JavaScript Modules in a Visual Analyzer Application FIGS. 4A-4D illustrate an example of utilizing reverse dependency injection to load JavaScript modules in a visual analyzer application according to some embodiments of the present invention. As described, in some embodiments, the visual analyzer application may be implemented in JavaScript and primarily executed in Web browsers and mobile devices. In certain embodiments, the code can use one of, or a combination of, code dependencies, component dependencies, and service dependencies.

For code dependency injection, some embodiments may use a framework such as RequireJS. FIG. 4A illustrates an example of the code implementing one module. In this example, a module can declare its dependencies on 8 external modules. In some embodiments, the framework ensures that the modules are loaded before module creation function is called with a reference to each of the modules as arguments. In certain embodiments, a visual analyzer plugin can be described by a plugin.xml file in the root directory of the plugin package, which can contain the declaration of modules, resources, and extensions. In some embodiments, a server side plugin service (e.g., dependency graph generator 102 in FIG. 1 or plugin loader 100) can read the plugin.xml file to determine the forward and reverse dependencies among the various modules (also referred to as components) for the visual analyzer plugin.

For component dependencies, as part of the implementation of the plugin framework, some embodiments may create instances of components that are not known by the module that is creating them. Some embodiments may have a registry of plugin components and determine which plugins to use e.g., by asking the user. Certain embodiments may then create instances of the component(s). FIG. 4B illustrates an example of the code for creating a visualization in a runtime environment such as Java. FIG. 4C illustrates an example of the code for creating a visualization with the way dynamic loading of JavaScript works with RequireJS.

Figure 4D:
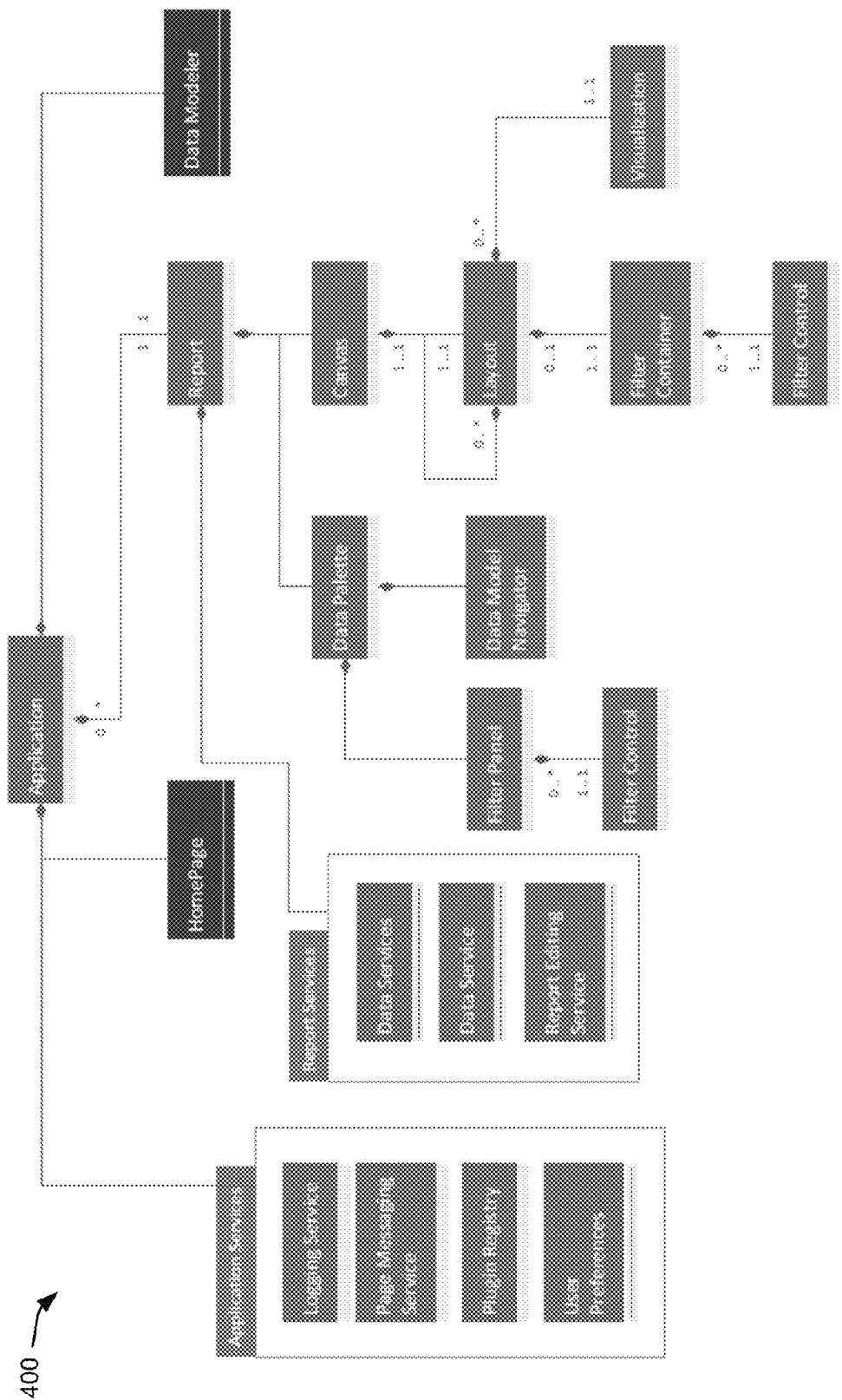

For service dependency injection, some embodiments may create a component hierarchy such as the example shown in FIG. 4D. When components are being loaded asynchronously, some embodiments may ensure that the sequencing of state changes are performed in a controlled manner. Certain embodiments may ensure that a parent is not set to start until all children are ready to be started. In some embodiments, to prevent problems when there are dependencies in between siblings or between branches of the tree, some embodiments utilize reverse dependency declaration. For example, service registries may need to be populated before other parts of the tree can reach running state. In certain embodiments, components can declare that they are a dependency for another component. Some embodiments allow any extension point or component to provide information about reverse dependencies.

In some embodiments, services may want to ensure that their code is loaded before the host to which they want to attached themselves. This enables a services, e.g., a data service in FIG. 4D to declare that it is a dependency for the report component. In some embodiments, the data service may attach itself to the report by implementing another extension point. In certain embodiments, a service may not know who will be the consumer of it. As such, some embodiments may allow an extension point to declare that everyone that implements that extension point will be part of a named group and another component may declare that it depends on all members of that group. In an example, the visual analyzer application can use this to allow contribution of color scheme declaration to multiple consumers of color schemes.

The component hierarchical dependency graph 400 can show the dependency relationship among various components/services for a visual analyzer application in accordance with embodiments. Conventionally, the report may declare that it needs a data service, and then when a data service is needed for a map visualization, then the top-level report may be changed to inform that it needs to create a hook for the data service. In a data visual analyzer system that is accessed via a Web browser, visualizations may be created and displayed through the Web browser. In such a Web environment, an instance cannot be created immediately without doing an asynchronous call to the server to download the JavaScript file. Further, in some instances, upfront knowledge about all the components is not desirable. In some embodiments, the new shared services need to be created in a central service registry by implementers of components in the system before any of the components can be created. Otherwise, those components may not be easily instantiated and the system may be busy waiting or polling the service registry for the shared components to appear.

Some embodiments determine whether one or more services should be available when a report is started. The report component may not and need not be aware of the service, but since other components that are hosted by the report component may need access to the data service when they are instantiated, the service may declare that it is a dependency on the report so that an instance of the data service may be created (and a handle to the report can be given to the data service) whenever a user tries to create a report. As such, the data service can hook itself into the report and other components that need the data service can ask the service registry (hosted by the report) for an instance of the data service. In this instance, these other components can trust that the data service will always be available because the system has enabled the data service to hook itself in when the report was created.

In one example, component A and component B can be delivered independently from the root application. If multiple instances of component B is created where all of them need component A, instead of having all of them try to create component A, the reverse dependency framework makes it such that component A declares it is a dependency of a root component, component B. As such, the framework solves the problem of not creating too many instances and having all of them to wait for the creation of the instances to be completed.

In certain embodiments, the visual analyzer component running on the mobile/client device can be doing all the processing in the Web browser. In some embodiments, the framework parses the dependency tree on the server before it is delivered to the client. Before shipping anything to the server, the dependency graph is generated, and if there is a loop/cycles, then the user may not be able to start the application. In some embodiments, the client side plugin framework can be based on ideas used in other plugin frameworks, e.g., the Eclipse framework, where plugins can declare dependencies on other plugins, to ensure that the plugin can execute properly when loading.

Furthermore, in some embodiments, one or more subcomponents of a plugin component can have a list of immediate dependencies (also referred to as forward dependencies), and a second order of dependencies (also referred to as reverse dependencies). As described, as JavaScript has a single thread of execution, it may take more time to download certain component as they are needed and requested. Further, the application may need to keep track of the components that have and have not been loaded in order to determine whether the sub-component may need to be loaded. To avoid creating disjointedness while the user is interacting with the visual analyzer application via a Web browser, embodiments may ensure that dependencies of a plugin are loaded before indicating that the plugin is ready for execution.

For example, component A can declare a forward dependency on B and D. In other words, A declares that it is dependent on B and D. C can declare that it is a dependency of A. In other words, C may have a reverse dependency relationship with A, where A is unaware of C's existence (i.e., the software code and declarations of A does not mention C). Upon receiving a user request to execute a plugin that includes A and C, some embodiments may determine the forward and reverse dependencies of A and C. As described, a dependency graph can be generated based on the code declarations and an ordered list of components generated based on the dependency graph. The system may then load the components per the ordered list of components and indicate that the plugin is ready for execution V. Another Example Flow In a regular forward dependency pattern, a visualization may declare that it has a dependency on a data service. However, when the system creates two visualizations per the user's request where each of the visualizations need an instance of a data service, inefficiencies arise if the system then creates an instance of a data service for each of the visualizations. Some embodiments may minimize inefficiencies by enabling a component to declare that it is a dependency of another component.

In one example, without requiring a visualization to declare a dependency relationship with a data service, the data service may declare that it is a dependency for the visualization. An instance of the data service may be created and loaded when an instance of the visualization is created (e.g., concurrently) and the system may allow multiple visualizations to use the same instance of the data service, instead of loading multiple instances of that service. Since the service is already loaded, subsequent instances of the visualization can use the same instance of the previously loaded component instance (e.g., data service instance). Not only does multiple instances of the component instance no longer need to be created, the component instance is readily available when required by another component, minimizing any lag time and improving the user experience.

In some embodiments, the data service may declare that it is a dependency for the report. Whenever the user would like to start a report component, the framework can create an instance of the data service and does not permit a user to interact with the report until the data service is available. This framework ensures that once the user starts to create the data visualizations, the instance of the data service is available and accessible to the various data visualizations. This prevents the situation of two components separately requiring and creating an instance of a data service. In certain embodiments, the user's requests to create the data visualizations are combined into one request to ensure that only one instance of the data service is created.

Figure 5:
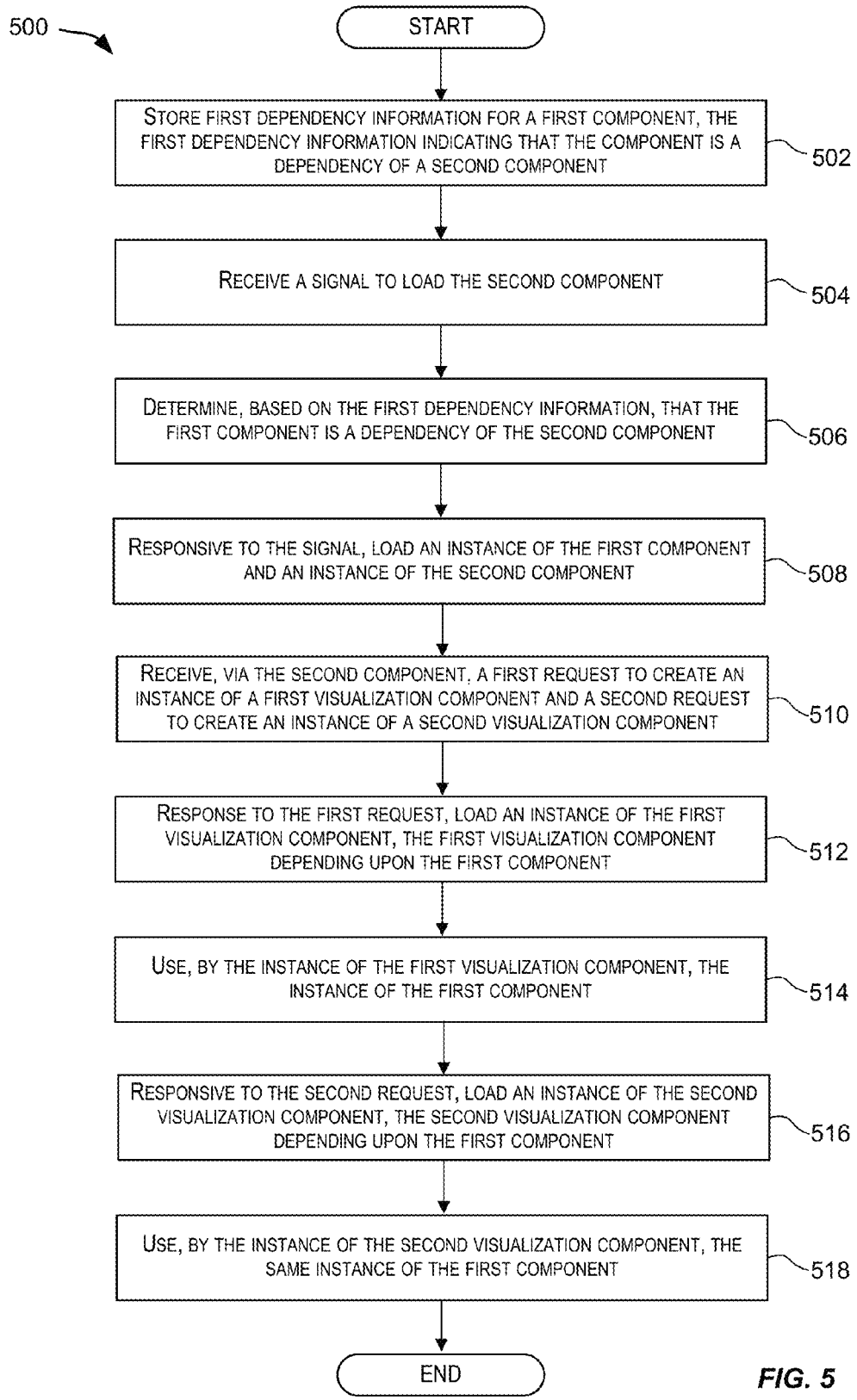
FIG. 5 illustrates an example process for enabling one or more components to use a pre-loaded instance of a data service component when reverse dependency injection is utilized in accordance with certain embodiments of the present invention.

FIG. 5 illustrates an example process 500 for enabling one or more components to use a pre-loaded instance of a data service component when reverse dependency injection is utilized in accordance with certain embodiments of the present invention. Some embodiments allow a component to declare that the component is a dependency of another component, or that the component has a "reverse dependency relationship" with the other component. In some embodiments, a system may create and load an instance of the component when a user indicates a desire to interact with the other component and prior to allowing the user to interact with the other component, as the component is a dependency of the other component. In such embodiments, the other component may not start executing until all the dependencies are loaded. This minimizes any user wait time when the user is interacting with the other component such as a data visualization that requires a data service to function.

At block 502, process 500 can store, by one or more processors, first dependency information for a first component, the first dependency information indicating that the first component is a dependency of a second component (i.e., a reverse dependency relationship). In some embodiments, the first component is a data service component and the second component is a report component. Some embodiments may also store second dependency information for the second component. In some embodiments, the second dependency information does not indicate that the second component is dependent upon the first component. The second component need not know about the first component. In certain embodiments, the second dependency information can include a forward dependency relationship with a third component or a reverse dependency relationship with a third component.

At block 504, process 500 can receive a signal to load the second component. In some embodiments, the signal to load the second component can be received when a user indicates that the user desires to interact with the second component. In certain embodiments, a user may start a component such as a report component that sends a visual analyzer application a signal to load the report component. The second component can be a plugin component in some embodiments.

At block 506, process 500 can determine based on the first dependency information, that the first component is a dependency of the second component. In some embodiments, the first dependency information can be part of configuration information associated with the first component. Some embodiments can determine the dependency information based on the software code declarations for a component. Based on the dependency information, some embodiments may determine that a component is a dependency of another component, or in other words, that the component has a reverse dependency relationship with the other component. In some embodiments, this reverse dependency relationship declares that the first component (e.g., a data service component) is needed by the second component (e.g., a report component) and that, while the second component may not be aware of the first component, the application is requires to have the first component loaded before allowing a user to interact with the second component.

At block 508, process 500 can load both an instance of the first component and an instance of the second component responsive to the signal. Some embodiments create an instance of each of the components and load them (e.g., onto the client device) in response to the user's request to start and interact with the second component.

At block 510, process 500 can receive, via the second component, a first request to create an instance of a first visualization component and a second request to create an instance of a second visualization component. In some embodiments, the request to create an instance of the visualization components can be received when the user requests to interact with one or more visualization components part of a visual analyzer application. In certain embodiments, an instance of the first visualization component can be a pie chart, a line chart, a bar chart, a scatterplot, or a map chart, etc. The requested interaction with the one or more visualization components can include, but is not limited to, a creation of a visualization component or a modification such as adding or removing a data dimension represented by the visualization.

At block 512, process 500 can, responsive to the first request, load an instance of the first visualization component. The first visualization component can be dependent upon the first component in some embodiments. In certain embodiments, a user may request to interact or create a visualization component. Upon receiving the user's request, the visual analyzer application may create and load an instance of the visualization component.

At block 514, process 500 can use, by the instance of the first visualization component, the instance of the first component. In some embodiments, interaction with the visualization component may require a call to a component instance such as a data service instance. Instead of pausing the application while the visualization component sends a request to create an instance of the data service in response to receiving the user request to interact with the visualization component, the data service instance may be readily available, minimizing any delays in the interaction. Signaling to the application to create the instance of the data service at the moment or shortly subsequent to when the user makes the request would cause the application to lag while it fetches the necessary information and loads the required component instances (also referred to as components in this disclosure) e.g., onto the client device.

At block 516, process 500 can, responsive to the second request, load an instance of the second visualization component, the second visualization component depending upon the first component. Similarly, the user may request to interact or create another visualization component. The visual analyzer application may create and load an instance of the other visualization component in response to receiving the user's request.

At block 518, process 500 can use, by the instance of the second visualization component, the same instance of the first component. Since an instance of the first component has already been created and loaded, the application need not create another instance of the first component for the other visualization component to use. As such, when multiple visualization components are to be created, the problem of potentially creating multiple instances of the data service components is avoided since the visualization components can all use the same instance of the pre-loaded data service component. Embodiments further improves efficiency in interacting with various visual analyzer components via a Web browser since the user no longer need to go back and forth with the server to retrieve dependency information and load a component (e.g., a data service component) when it is determined to be needed.

VI. Example Distributed System

Figure 6:
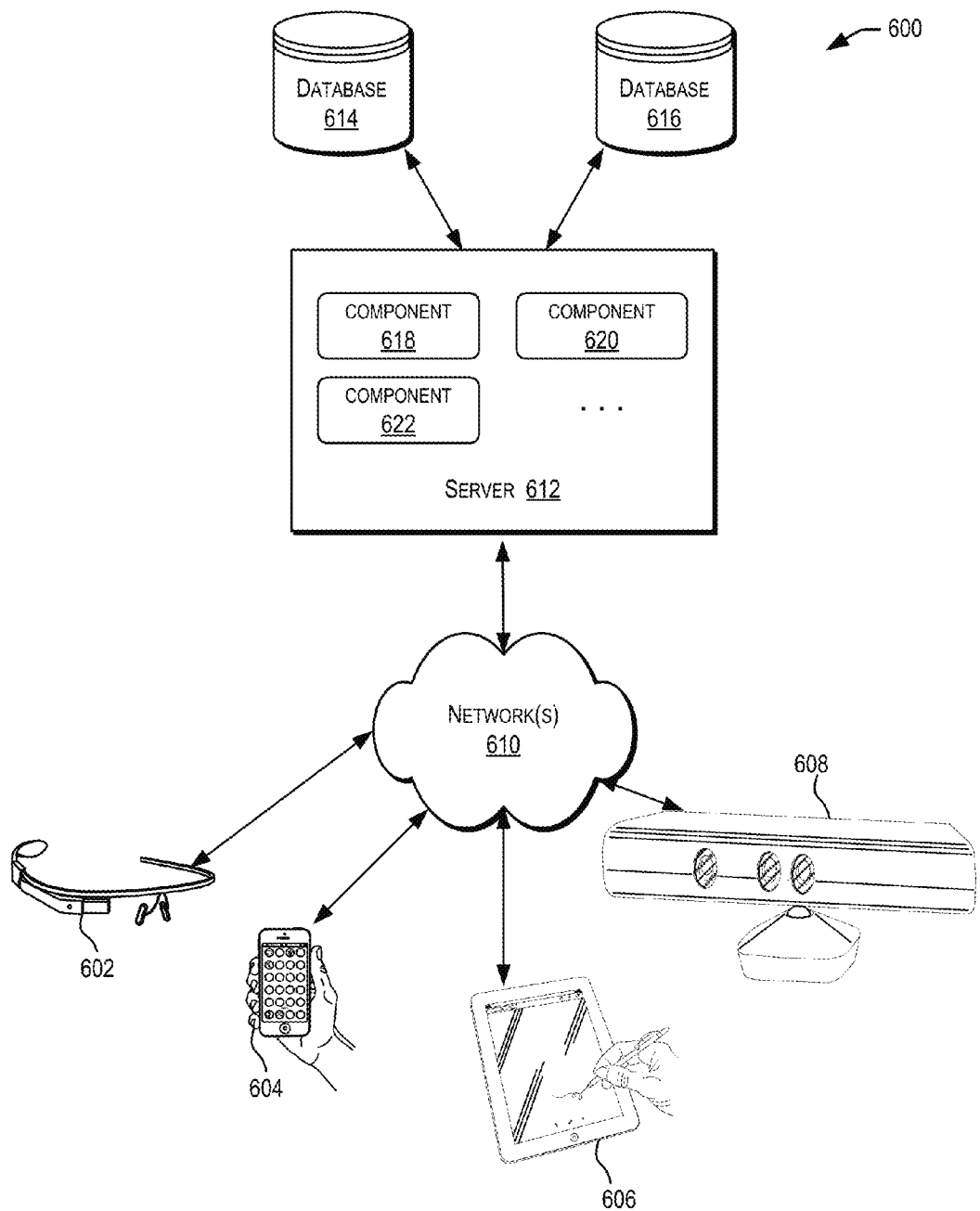
FIG. 6 depicts a simplified diagram of a distributed system for implementing an embodiment of the present invention.

FIG. 6 depicts a simplified diagram of a distributed system 600 for implementing an embodiment. In the illustrated embodiment, distributed system 600 includes one or more client computing devices 602, 604, 606, and 608, which are configured to execute and operate a client application such as a web browser, proprietary client (e.g., Oracle Forms), or the like over one or more network(s) 610. Server 612 may be communicatively coupled with remote client computing devices 602, 604, 606, and 608 via network 610.

In various embodiments, server 612 may be adapted to run one or more services or software applications such as services and applications that provide the document (e.g., webpage) analysis and modification-related processing. In certain embodiments, server 612 may also provide other services or software applications that can include non-virtual and virtual environments. In some embodiments, these services may be offered as web-based or cloud services or under a Software as a Service (SaaS) model to the users of client computing devices 602, 604, 606, and/or 608. Users operating client computing devices 602, 604, 606, and/or 608 may in turn utilize one or more client applications to interact with server 612 to utilize the services provided by these components.

In the configuration depicted in FIG. 6, software components 618, 620 and 622 of system 600 are shown as being implemented on server 612. In other embodiments, one or more of the components of system 600 and/or the services provided by these components may also be implemented by one or more of the client computing devices 602, 604, 606, and/or 608. Users operating the client computing devices may then utilize one or more client applications to use the services provided by these components. These components may be implemented in hardware, firmware, software, or combinations thereof. It should be appreciated that various different system configurations are possible, which may be different from distributed system 600. The embodiment shown in FIG. 6 is thus one example of a distributed system for implementing an embodiment system and is not intended to be limiting.

Client computing devices 602, 604, 606, and/or 608 may include various types of computing systems. For example, client computing devices may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile °, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox® gaming console with or without a Kinect® gesture input device), and/or a personal messaging device, capable of communicating over network(s) 610.

Although distributed system 600 in FIG. 6 is shown with four client computing devices, any number of client computing devices may be supported. Other devices, such as devices with sensors, etc., may interact with server 612.

Network(s) 610 in distributed system 600 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, network(s) 610 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

Server 612 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 612 can include one or more virtual machines running virtual operating systems, or other computing architectures involving virtualization. One or more flexible pools of logical storage devices can be virtualized to maintain virtual storage devices for the server. Virtual networks can be controlled by server 612 using software defined networking. In various embodiments, server 612 may be adapted to run one or more services or software applications described in the foregoing disclosure. For example, server 612 may correspond to a server for performing processing as described above according to an embodiment of the present disclosure.

Server 612 may run an operating system including any of those discussed above, as well as any commercially available server operating system. Server 612 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 612 may include one or more applications to analyze and consolidate data feeds and/or event updates received from users of client computing devices 602, 604, 606, and 608. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 612 may also include one or more applications to display the data feeds and/or real-time events via one or more display devices of client computing devices 602, 604, 606, and 608.

Distributed system 600 may also include one or more databases 614 and 616. These databases may provide a mechanism for storing information such as user interactions information, usage patterns information, adaptation rules information, and other information used by embodiments of the present invention. Databases 614 and 616 may reside in a variety of locations. By way of example, one or more of databases 614 and 616 may reside on a non-transitory storage medium local to (and/or resident in) server 612. Alternatively, databases 614 and 616 may be remote from server 612 and in communication with server 612 via a network-based or dedicated connection. In one set of embodiments, databases 614 and 616 may reside in a storage-area network (SAN). Similarly, any necessary files for performing the functions attributed to server 612 may be stored locally on server 612 and/or remotely, as appropriate. In one set of embodiments, databases 614 and 616 may include relational databases, such as databases provided by Oracle, that are adapted to store, update, and retrieve data in response to SQL-formatted commands.

VII. Example System Environment

Figure 7:
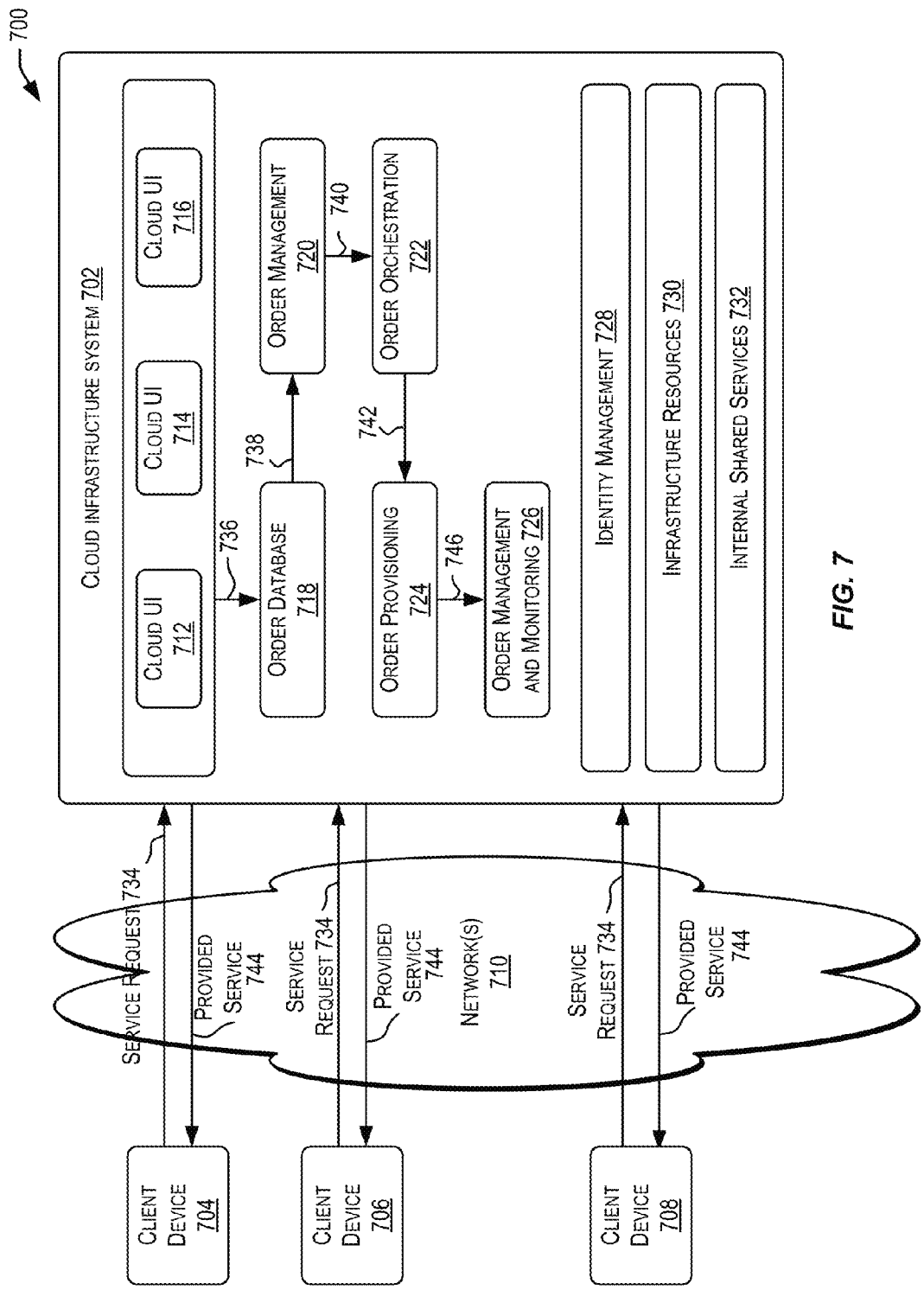
FIG. 7 is a simplified block diagram of one or more components of a system environment in which services may be offered as cloud services, in accordance with an embodiment of the present disclosure.

In some embodiments, the document analysis and modification services described above may be offered as services via a cloud environment. FIG. 7 is a simplified block diagram of one or more components of a system environment 700 in which services may be offered as cloud services, in accordance with an embodiment of the present disclosure. In the illustrated embodiment in FIG. 7, system environment 700 includes one or more client computing devices 704, 706, and 708 that may be used by users to interact with a cloud infrastructure system 702 that provides cloud services, including services for dynamically modifying documents (e.g., webpages) responsive to usage patterns. Cloud infrastructure system 702 may comprise one or more computers and/or servers that may include those described above for server 612.

It should be appreciated that cloud infrastructure system 702 depicted in FIG. 7 may have other components than those depicted. Further, the embodiment shown in FIG. 7 is only one example of a cloud infrastructure system that may incorporate an embodiment of the invention. In some other embodiments, cloud infrastructure system 702 may have more or fewer components than shown in the figure, may combine two or more components, or may have a different configuration or arrangement of components.

Client computing devices 704, 706, and 708 may be devices similar to those described above for 602, 604, 606, and 608. Client computing devices 704, 706, and 708 may be configured to operate a client application such as a web browser, a proprietary client application (e.g., Oracle Forms), or some other application, which may be used by a user of the client computing device to interact with cloud infrastructure system 702 to use services provided by cloud infrastructure system 702. Although exemplary system environment 700 is shown with three client computing devices, any number of client computing devices may be supported. Other devices such as devices with sensors, etc. may interact with cloud infrastructure system 702.

Network(s) 710 may facilitate communications and exchange of data between clients 704, 706, and 708 and cloud infrastructure system 702. Each network may be any type of network familiar to those skilled in the art that can support data communications using any of a variety of commercially-available protocols, including those described above for network(s) 610.

In certain embodiments, services provided by cloud infrastructure system 702 may include a host of services that are made available to users of the cloud infrastructure system on demand. In addition to services related to dynamic document modification responsive usage patterns, various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In certain embodiments, a specific instantiation of a service provided by cloud infrastructure system 702 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's website.

In certain embodiments, cloud infrastructure system 702 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 702 may also provide "big data" elated computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 702 may be adapted to automatically provision, manage and track a customer's subscription to services offered by cloud infrastructure system 702. Cloud infrastructure system 702 may provide the cloud services via different deployment models. For example, services may be provided under a public cloud model in which cloud infrastructure system 702 is owned by an organization selling cloud services (e.g., owned by Oracle Corporation) and the services are made available to the general public or different industry enterprises. As another example, services may be provided under a private cloud model in which cloud infrastructure system 702 is operated solely for a single organization and may provide services for one or more entities within the organization. The cloud services may also be provided under a community cloud model in which cloud infrastructure system 702 and the services provided by cloud infrastructure system 702 are shared by several organizations in a related community. The cloud services may also be provided under a hybrid cloud model, which is a combination of two or more different models.

In some embodiments, the services provided by cloud infrastructure system 702 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 702. Cloud infrastructure system 702 then performs processing to provide the services in the customer's subscription order.

In some embodiments, the services provided by cloud infrastructure system 702 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 702 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 702 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 702 may also include infrastructure resources 730 for providing the resources used to provide various services to customers of the cloud infrastructure system. In one embodiment, infrastructure resources 730 may include pre-integrated and optimized combinations of hardware, such as servers, storage, and networking resources to execute the services provided by the PaaS platform and the SaaS platform, and other resources.

In some embodiments, resources in cloud infrastructure system 702 may be shared by multiple users and dynamically re-allocated per demand. Additionally, resources may be allocated to users in different time zones. For example, cloud infrastructure system 702 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 732 may be provided that are shared by different components or modules of cloud infrastructure system 702 to enable provision of services by cloud infrastructure system 702. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 702 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 702, and the like.

In one embodiment, as depicted in FIG. 7, cloud management functionality may be provided by one or more modules, such as an order management module 720, an order orchestration module 722, an order provisioning module 724, an order management and monitoring module 726, and an identity management module 728. These modules may include or be provided using one or more computers and/or servers, which may be general purpose computers, specialized server computers, server farms, server clusters, or any other appropriate arrangement and/or combination.

In an exemplary operation, at 734, a customer using a client device, such as client device 704, 706 or 708, may interact with cloud infrastructure system 702 by requesting one or more services provided by cloud infrastructure system 702 and placing an order for a subscription for one or more services offered by cloud infrastructure system 702. In certain embodiments, the customer may access a cloud User Interface (UI) such as cloud UI 712, cloud UI 714 and/or cloud UI 716 and place a subscription order via these UIs. The order information received by cloud infrastructure system 702 in response to the customer placing an order may include information identifying the customer and one or more services offered by the cloud infrastructure system 702 that the customer intends to subscribe to.

At 736, the order information received from the customer may be stored in an order database 718. If this is a new order, a new record may be created for the order. In one embodiment, order database 718 can be one of several databases operated by cloud infrastructure system 718 and operated in conjunction with other system elements.

At 738, the order information may be forwarded to an order management module 720 that may be configured to perform billing and accounting functions related to the order, such as verifying the order, and upon verification, booking the order.

At 740, information regarding the order may be communicated to an order orchestration module 722 that is configured to orchestrate the provisioning of services and resources for the order placed by the customer. In some instances, order orchestration module 722 may use the services of order provisioning module 724 for the provisioning. In certain embodiments, order orchestration module 722 enables the management of business processes associated with each order and applies business logic to determine whether an order should proceed to provisioning.

As shown in the embodiment depicted in FIG. 7, at 742, upon receiving an order for a new subscription, order orchestration module 722 sends a request to order provisioning module 724 to allocate resources and configure resources needed to fulfill the subscription order. Order provisioning module 724 enables the allocation of resources for the services ordered by the customer. Order provisioning module 724 provides a level of abstraction between the cloud services provided by cloud infrastructure system 700 and the physical implementation layer that is used to provision the resources for providing the requested services. This enables order orchestration module 722 to be isolated from implementation details, such as whether or not services and resources are actually provisioned on the fly or pre-provisioned and only allocated/assigned upon request.

At 744, once the services and resources are provisioned, a notification may be sent to the subscribing customers indicating that the requested service is now ready for use. In some instance, information (e.g. a link) may be sent to the customer that enables the customer to start using the requested services.

At 746, a customer's subscription order may be managed and tracked by an order management and monitoring module 726. In some instances, order management and monitoring module 726 may be configured to collect usage statistics regarding a customer use of subscribed services. For example, statistics may be collected for the amount of storage used, the amount of data transferred, the number of users, and the amount of system up time and system down time, and the like.

In certain embodiments, cloud infrastructure system 700 may include an identity management module 728 that is configured to provide identity services, such as access management and authorization services in cloud infrastructure system 700. In some embodiments, identity management module 728 may control information about customers who wish to utilize the services provided by cloud infrastructure system 702. Such information can include information that authenticates the identities of such customers and information that describes which actions those customers are authorized to perform relative to various system resources (e.g., files, directories, applications, communication ports, memory segments, etc.) Identity management module 728 may also include the management of descriptive information about each customer and about how and by whom that descriptive information can be accessed and modified.

VII. Example Computer System

Figure 8:
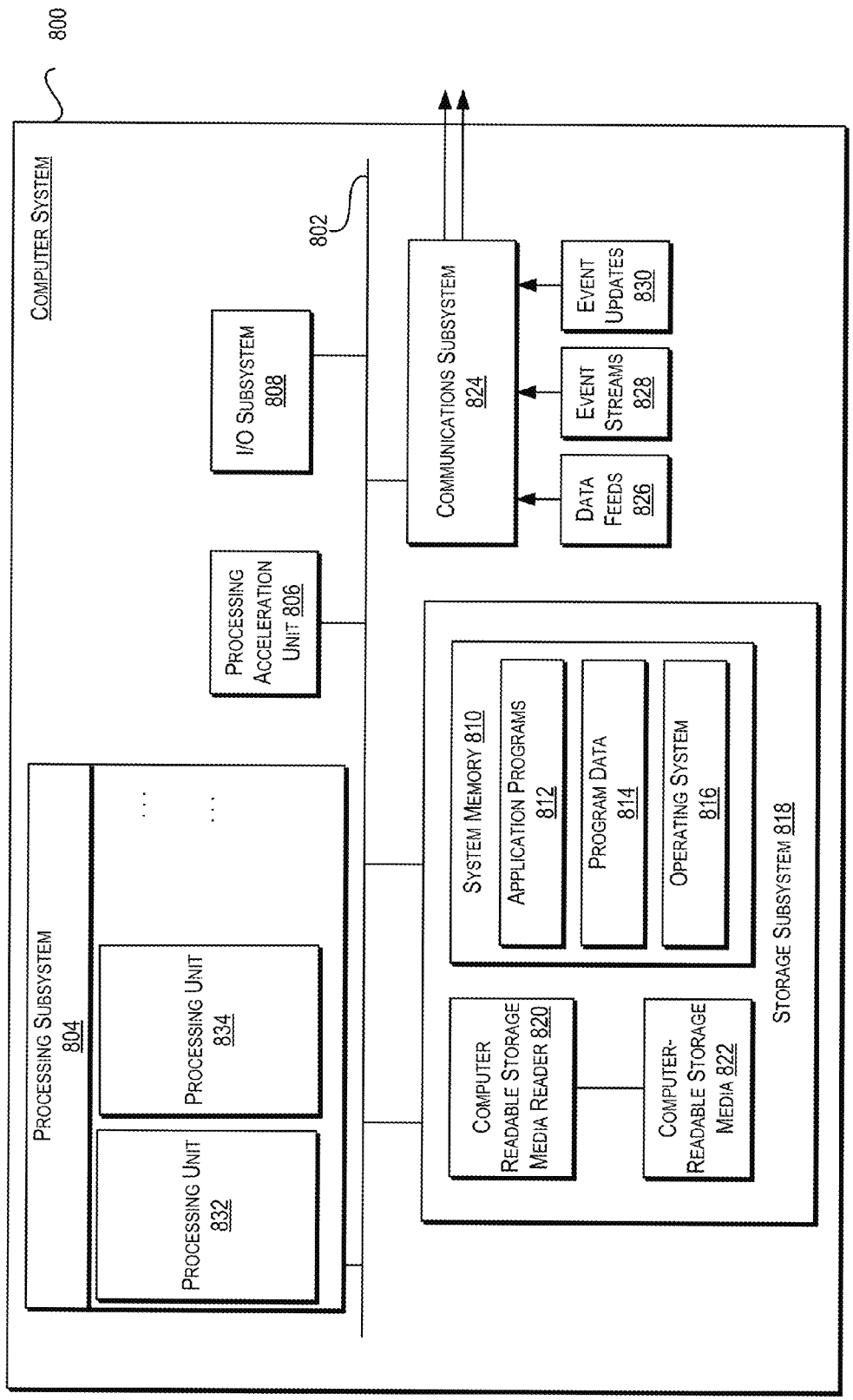
FIG. 8 illustrates an exemplary computer system that may be used to implement an embodiment of the present invention.

FIG. 8 illustrates an exemplary computer system 800 that may be used to implement an embodiment of the present invention. In some embodiments, computer system 800 may be used to implement any of the various servers and computer systems described above. As shown in FIG. 8, computer system 800 includes various subsystems including a processing unit 804 that communicates with a number of peripheral subsystems via a bus subsystem 802. These peripheral subsystems may include a processing acceleration unit 806, an I/O subsystem 808, a storage subsystem 818 and a communications subsystem 824. Storage subsystem 818 may include tangible computer-readable storage media 822 and a system memory 810.

Bus subsystem 802 provides a mechanism for letting the various components and subsystems of computer system 800 communicate with each other as intended. Although bus subsystem 802 is shown schematically as a single bus, alternative embodiments of the bus subsystem may utilize multiple buses. Bus subsystem 802 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 804 controls the operation of computer system 800 and may comprise one or more processing units 832, 834, etc. A processing unit may include be one or more processors, including single core or multicore processors, one or more cores of processors, or combinations thereof. In some embodiments, processing subsystem 804 can include one or more special purpose co-processors such as graphics processors, digital signal processors (DSPs), or the like. In some embodiments, some or all of the processing units of processing subsystem 804 can be implemented using customized circuits, such as application specific integrated circuits (ASICs), or field programmable gate arrays (FPGAs).

In some embodiments, the processing units in processing subsystem 804 can execute instructions stored in system memory 810 or on computer readable storage media 822. In various embodiments, the processing units can execute a variety of programs or code instructions and can maintain multiple concurrently executing programs or processes. At any given time, some or all of the program code to be executed can be resident in system memory 810 and/or on computer-readable storage media 822 including potentially on one or more storage devices. Through suitable programming, processing subsystem 804 can provide various functionalities described above for dynamically modifying documents (e.g., webpages) responsive to usage patterns.

In certain embodiments, a processing acceleration unit 806 may be provided for performing customized processing or for off-loading some of the processing performed by processing subsystem 804 so as to accelerate the overall processing performed by computer system 800.

I/O subsystem 808 may include devices and mechanisms for inputting information to computer system 800 and/or for outputting information from or via computer system 800. In general, use of the term "input device" is intended to include all possible types of devices and mechanisms for inputting information to computer system 800. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 800 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 818 provides a repository or data store for storing information that is used by computer system 800. Storage subsystem 818 provides a tangible non-transitory computer-readable storage medium for storing the basic programming and data constructs that provide the functionality of some embodiments. Software (programs, code modules, instructions) that when executed by processing subsystem 804 provide the functionality described above may be stored in storage subsystem 818. The software may be executed by one or more processing units of processing subsystem 804. Storage subsystem 818 may also provide a repository for storing data used in accordance with the present invention.

Storage subsystem 818 may include one or more non-transitory memory devices, including volatile and non-volatile memory devices. As shown in FIG. 8, storage subsystem 818 includes a system memory 810 and a computer-readable storage media 822. System memory 810 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 800, such as during start-up, may typically be stored in the ROM. The RAM typically contains data and/or program modules that are presently being operated and executed by processing subsystem 804. In some implementations, system memory 810 may include multiple different types of memory, such as static random access memory (SRAM) or dynamic random access memory (DRAM).

By way of example, and not limitation, as depicted in FIG. 8, system memory 810 may store application programs 812, which may include client applications, Web browsers, mid-tier applications, relational database management systems (RDBMS), etc., program data 814, and an operating system 816. By way of example, operating system 816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 822 may store programming and data constructs that provide the functionality of some embodiments. Software (programs, code modules, instructions) that, when executed by processing subsystem 804 provides the functionality described above, may be stored in storage subsystem 818. By way of example, computer-readable storage media 822 may include non-volatile memory such as a hard disk drive, a magnetic disk drive, an optical disk drive such as a CD ROM, DVD, a Blu-Ray® disk, or other optical media. Computer-readable storage media 822 may include, but is not limited to, Zip® drives, flash memory cards, universal serial bus (USB) flash drives, secure digital (SD) cards, DVD disks, digital video tape, and the like. Computer-readable storage media 822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 822 may provide storage of computer-readable instructions, data structures, program modules, and other data for computer system 800.

In certain embodiments, storage subsystem 800 may also include a computer-readable storage media reader 820 that can further be connected to computer-readable storage media 822. Together and, optionally, in combination with system memory 810, computer-readable storage media 822 may comprehensively represent remote, local, fixed, and/or removable storage devices plus storage media for storing computer-readable information.

In certain embodiments, computer system 800 may provide support for executing one or more virtual machines. Computer system 800 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 800. Accordingly, multiple operating systems may potentially be run concurrently by computer system 800. Each virtual machine generally runs independently of the other virtual machines.

Communications subsystem 824 provides an interface to other computer systems and networks. Communications subsystem 824 serves as an interface for receiving data from and transmitting data to other systems from computer system 800. For example, communications subsystem 824 may enable computer system 800 to establish a communication channel to one or more client devices via the Internet for receiving and sending information from and to the client devices. For example, visual analyzer system 102 depicted in FIG. 1 may receive user interactions information and webpage requests from client devices using communication subsystem 824. Additionally, communication subsystem 824 may be used to communicate webpages from visual analyzer system 102 to the requesting clients.

Communication subsystem 824 may support both wired and/or wireless communication protocols. For example, in certain embodiments, communications subsystem 824 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 824 can provide wired network connectivity (e.g., Ethernet) in addition to or instead of a wireless interface.

Communication subsystem 824 can receive and transmit data in various forms. For example, in some embodiments, communications subsystem 824 may receive input communication in the form of structured and/or unstructured data feeds 826, event streams 828, event updates 830, and the like. For example, communications subsystem 824 may be configured to receive (or send) data feeds 826 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 824 may be configured to receive data in the form of continuous data streams, which may include event streams 828 of real-time events and/or event updates 830, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 824 may also be configured to output the structured and/or unstructured data feeds 826, event streams 828, event updates 830, and the like to one or more databases that may be in communication with one or more streaming data source computers coupled to computer system 800.

Computer system 800 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 800 depicted in FIG. 8 is intended only as a specific example. Many other configurations having more or fewer components than the system depicted in FIG. 8 are possible. Based on the disclosure and teachings provided herein, a person of ordinary skill in the art will appreciate other ways and/or methods to implement the various embodiments.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps. Various features and aspects of the above-described embodiments may be used individually or jointly.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter-process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific invention embodiments have been described, these are not intended to be limiting. Various modifications and equivalents are within the scope of the following claims.

What is claimed is:

1. A method comprising:
   receiving, by one or more processors, a signal to load a plugin component, the plugin component being associated with a plurality of components including another component, wherein the other component is a dependency of the plugin component;
   determining configuration information for the plugin component;
   based on the configuration information, generating a data structure which represents both forward dependencies and reverse dependencies among the plurality of components associated with the plugin component;
   analyzing the data structure to determine an ordered list of loadings for the plurality of components;
   loading an instance of the other component and an instance of the plugin component based on the ordered list of loadings;
   upon loading the instance of the other component and the instance of the plugin component, indicating that the plugin component is ready for execution;
   receiving, via the instance of the plugin component, a request to create an instance of a visualization component;
   responsive to the request, loading the instance of the visualization component, the visualization component being dependent upon the other component; and
   using, by the instance of the visualization component, the instance of the other component.

2. The method of claim 1, wherein the forward dependency indicates one or more components that are declaratively needed by a component in the plugin component, and wherein the reverse dependency indicates that the component declares that the component is needed by one or more other components.

3. The method of claim 1, further comprising:
   enabling a set of components to declare forward and reverse dependencies with another set of components for the plugin component, wherein a first component is declared to be a reverse dependency of a second component, and wherein the first component is loaded prior to providing an indication that the second component is ready for execution.

4. The method of claim 3, wherein the plugin component is a report component or a data visualization component of a visual analyzer application and wherein the other component is a data service component.

5. The method of claim 1, wherein the configuration information includes dependency information between components of the plugin component, the method further comprising:
storing first dependency information for the other component, the first dependency information indicating that the other component is a dependency of the plugin component, wherein determining the configuration information includes determining the first dependency information for the other component.

6. The method of claim 5, further comprising:
receiving, via the instance of the plugin component, another request to create an instance of another visualization component;
responsive to the other request, loading an instance of the other visualization component, the other visualization component being dependent upon the other component;
using, by the instance of the other visualization component,
the same instance of the other component.

7. The method of claim 6, further comprising:
storing second dependency information for the plugin component, wherein the second dependency information does not indicate that the plugin component is dependent upon the other component, and wherein the second dependency information includes a forward or reverse dependency relationship with yet another component.

8. A system comprising:
one or more processors; and
memory coupled to the one or more processors, the memory encoded with a set of instructions configured to perform a process comprising:
receiving, by the one or more processors, a signal to load a plugin component, the plugin component being associated with a plurality of components including another component, wherein the other component is a dependency of the plugin component;
determining configuration information for the plugin component;
based on the configuration information, generating a data structure which represents both forward dependencies and reverse dependencies among the plurality of components associated with the plugin component;
analyzing the data structure to determine an ordered list of loadings for the plurality of components;
loading an instance of the other component and an instance of the plugin component based on the ordered list of loadings;
upon loading the instance of the other component and the instance of the plugin component, indicating that the plugin component is ready for execution;
receiving, via the instance of the plugin component, a request to create an instance of a visualization component;
responsive to the request, loading the instance of the visualization component, the visualization component being dependent upon the other component; and
using, by the instance of the visualization component, the instance of the other component.

9. The system of claim 8, wherein the forward dependency indicates one or more components that are declaratively needed by a component in the plugin component, and wherein the reverse dependency indicates that the component declares that the component is needed by one or more other components.

10. The system of claim 8, wherein the set of instructions are further configured to perform the process comprising:
enabling a set of components to declare forward and reverse dependencies with another set of components for the plugin component, wherein a first component is declared to be a reverse dependency of a second component, and wherein the first component is loaded prior to providing an indication that the second component is ready for execution.

11. The system of claim 10, wherein the plugin component is a report component or a data visualization component of a visual analyzer application and wherein the other component is a data service component.

12. The system of claim 8, wherein the configuration information includes dependency information between components of the plugin component, and wherein the set of instructions are further configured to perform the process comprising:
storing first dependency information for the other component, the first dependency information indicating that the other component is a dependency of the plugin component, wherein determining the configuration information includes determining the first dependency information for the other component.

13. The system of claim 12, wherein the set of instructions are further configured to perform the process comprising:
receiving, via the instance of the plugin component, another request to create an instance of another visualization component;
responsive to the other request, loading an instance of the other visualization component, the other visualization component being dependent upon the other component;
using, by the instance of the other visualization component,
the same instance of the other first component.

14. The system of claim 13, wherein the set of instructions are further configured to perform the process comprising:
storing second dependency information for the plugin component, wherein the second dependency information does not indicate that the plugin component is dependent upon the other component, and wherein the second dependency information includes a forward or reverse dependency relationship with yet another component.

15. A non-transitory computer readable storage medium storing instructions that, when executed by one or more processors of a first computing device, cause the first computing device to perform operations comprising:
receiving, by the one or more processors, a signal to load a plugin component, the plugin component being associated with a plurality of components including another component, wherein the other component is a dependency of the plugin component;
determining configuration information for the plugin component;

based on the configuration information, generating a data structure which represents both forward dependencies and reverse dependencies among the plurality of components associated with the plugin component;

analyzing the data structure to determine an ordered list of loadings for the plurality of components;

loading an instance of the other component and an instance of the plugin component based on the ordered list of loadings;

upon loading the instance of the other component and the instance of the plugin component, indicating that the plugin component is ready for execution;

receiving, via the instance of the plugin component, a request to create an instance of a visualization component;

responsive to the request, loading the instance of the visualization component, the visualization component being dependent upon the other component; and using, by the instance of the visualization component, the instance of the other component.

16. The computer readable storage medium of claim 15, wherein the forward dependency indicates one or more components that are declaratively needed by a component in the plugin component, and wherein the reverse dependency indicates that the component declares that the component is needed by one or more other components.

17. The computer readable storage medium of claim 15, wherein the instructions further cause the first computing device to perform operations comprising:

enabling a set of components to declare forward and reverse dependencies with another set of components for the plugin component, wherein a first component is declared to be a reverse dependency of a second component, and wherein the first component is loaded prior to providing an indication that the second component is ready for execution.

18. The computer readable storage medium of claim 17, wherein the plugin component is a report component or a data visualization component of a visual analyzer application and wherein the other component is a data service component.

19. The computer readable storage medium of claim 18, wherein the configuration information includes dependency information between components of the plugin component, and wherein the instructions further cause the first computing device to perform operations comprising:

storing first dependency information for the other component, the first dependency information indicating that the other component is a dependency of the plugin component, wherein determining the configuration information includes determining the first dependency information for the other component.

20. The computer readable storage medium of claim 19, wherein the instructions further cause the first computing device to perform operations comprising:

receiving, via the instance of the plugin component, another request to create an instance of another visualization component;

responsive to the other request, loading an instance of the other visualization component, the other visualization component being dependent upon the other component;

using, by the instance of the other visualization component, the same instance of the other component.

* * * * *

UNITED STATES PATENT AND TRADEMARK OFFICE
CERTIFICATE OF CORRECTION

| | | |
|---|---|---|
| PATENT NO. | : 9,535,726 B2 | Page 1 of 1 |
| APPLICATION NO. | : 14/866343 | |
| DATED | : January 3, 2017 | |
| INVENTOR(S) | : Lagerblad et al. | |

It is certified that error appears in the above-identified patent and that said Letters Patent is hereby corrected as shown below:

In the Specification

In Column 15, Line 54, after "execution" insert -- . --.

In Column 19, Line 5, delete "Mobile °," and insert -- Mobile®, --, therefor.

In the Claims

In Column 32, Line 47, in Claim 13, after "other" delete "first".

Signed and Sealed this
Eighth Day of August, 2017

Joseph Matal
*Performing the Functions and Duties of the*
*Under Secretary of Commerce for Intellectual Property and*
*Director of the United States Patent and Trademark Office*